(12) United States Patent
Yamauchi

(10) Patent No.: US 7,602,549 B2
(45) Date of Patent: Oct. 13, 2009

(54) SCREEN AND IMAGE PROJECTION SYSTEM

(75) Inventor: Naofumi Yamauchi, c/o Seiko Instruments Inc. 8, Makase 1-chome, Mihama-ku, Chiba-shi, Chiba 261-8507 (JP)

(73) Assignee: Naofumi Yamauchi (JP)

( * ) Notice: Subject to any disclaimer, the term of this patent is extended or adjusted under 35 U.S.C. 154(b) by 512 days.

(21) Appl. No.: 11/439,903

(22) Filed: May 24, 2006

(65) Prior Publication Data

US 2006/0279840 A1  Dec. 14, 2006

(30) Foreign Application Priority Data

Jun. 8, 2005 (JP) ............................. 2005-168099

(51) Int. Cl.
G03B 21/56 (2006.01)
G03B 21/60 (2006.01)

(52) U.S. Cl. ........................ 359/449; 359/459; 359/461

(58) Field of Classification Search ................. 359/461, 359/449, 459
See application file for complete search history.

(56) References Cited

U.S. PATENT DOCUMENTS

| 5,353,152 | A  | * | 10/1994 | Realmuto ................ 359/461 |
| 6,297,905 | B1 | * | 10/2001 | Takamoto et al. ......... 359/461 |
| 6,424,463 | B1 | * | 7/2002  | Nishitani ................. 359/449 |
| 7,042,640 | B2 | * | 5/2006  | Devos et al. ............. 359/443 |

* cited by examiner

*Primary Examiner*—Christopher Mahoney
(74) *Attorney, Agent, or Firm*—Adams & Wilks

(57) ABSTRACT

A screen having two optical characteristics is realized in a compact structure. As a result, a structure is provided where two types of screen surface having different optical characteristics are formed on the same side of the same sheet, and wound in a single storage tube, and it is possible to pull out and fix the first screen from the storage tube in a state where the second screen is stored in the storage tube.

18 Claims, 3 Drawing Sheets

SCREEN AND IMAGE PROJECTION SYSTEM

BACKGROUND OF THE INVENTION

The present invention relates to a screen for a projector for projecting an optical image from a high luminance CRT or liquid crystal projector etc., and to a projection system comprising these components.

A projection system for displaying an image by projecting an optical image using a high luminance CRT or liquid crystal projector can simply display a high definition image on a large screen, which means that it has become widely used as an information communication tool for a large number of users. In a screen for this projector, there have been schemes to improve light use efficiency by having a structure where a white material having high optical reflectance and a light reflecting film are coated on a surface, and to improve visibility for a plurality of observers by dispersing beads on the surface to cause light diffusion. Also, a screen that is capable of switching between screen surfaces of differing characteristics, such as a surface that has a polarization plate and a surface that does not have a polarization plate, is disclosed in Japanese patent laid-open No. Hei. 08-201918 (referred to in the following as patent publication 1).

However, with the screen disclosed in patent publication 1 that is capable of switching between screen surfaces of differing characteristics, one of the screen surfaces is exposed, and there is a problem that storage is difficult.

Also, if these two types of screen surfaces are stored at the same time, there is a problem that it is necessary to individually provide a storage tube for each screen surface.

SUMMARY OF THE INVENTION

It is an object of the present invention to provide a screen capable of storing screen surfaces of differing characteristics in a single storage tube.

A screen of the present invention has two types of screen of differing optical characteristics formed on the same side of the same sheet, constructed capable of being wound in a single storage tube. Also, spring support bodies having spring characteristics that allow winding like an elastic spring are coupled on both side ends parallel to the winding direction of the screen. With type of structure, side ends of the screen long in the winding direction do not get caught inside, allowing the surface of the screen surface to be a smooth projection surface, and it is possible to improve projection image quality.

Further, it is possible to use a screen that is bent from a boundary of screens having differing characteristics. In this way, it becomes possible to project an image in a state where the size of a screen surface used is made constant. Also, by providing a spindle having an operation of drawing the screen downwards at a bent section, it becomes possible to keep the projection surface smooth even when the screen is bent. Also, this spindle has a slit structure constructed gripping the front and rear surfaces of the screen, and it becomes possible to freely pass the screen through an inner part of this slit.

Further, by having a structure where spring support bodies having spring properties are divided at the boundary of the screens having differing characteristics, a smooth projection surface is made possible as far as the vicinity of the bent section.

DETAILED DESCRIPTION OF THE PRESENT INVENTION

Figure 1A:
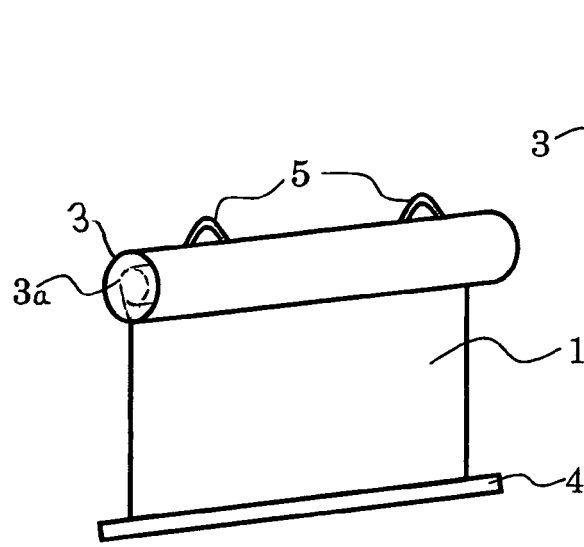
FIGS. 1A and 1B are perspective drawings showing a screen of the present invention.

A screen of the present invention comprises a first screen having first optical characteristics, and a second screen having second optical characteristics different from the first optical characteristics, formed on the same surface and in the same direction of a projection surface, and a storage tube for storing the first screen and the second screens wound together. In a state where the second screen is stored in the storage tube, it is possible to pull the first screen from the storage tube and fix it. Specifically, a stopper structure is provided so as to maintain a state where the first screen is pulled out and a state when the second screen is wound in the storage tube, at the same time.

With this type of structure, it becomes possible to store two screens having different characteristics is a single storage tube, and it is possible to make a storage space for the screen small. Since it becomes possible to have a structure with a screen suitable for bright high definition image projection having directivity, and a screen suitable for image projection with a wide viewing angle giving a perspective on nature, provided in a single screen unit, it is possible to select the screen depending on the projection image and the viewer's preference.

Further, a first arm structure for supporting the first screen and a second arm structure for supporting the second screen are provided on a rear side of the projection surface of the screen. Here, the first arm structure and the second arm structure are respectively constituted by a pair of arms defining an X shape, with the pair of arms of the first arm structure and the pair of arms of the second arm structure being joined in a rotatable fashion by an arm clamp. Also, the pair of arms of the first arm structure has one end connected to the arm clamp, and the other ends connected to a drawing out side of the first screen.

Also, a spindle section is provided for imparting tension to the surface of the first screen in a state where the first screen has been drawn out. At this time, an end bearing body is provided at a tip end section of the first screen, and the spindle section freely rotates without fixing the first screen. In this way, the end bearing body prevents the spindle section dipping down. Specifically, the spindle section is comprised of a columnar spindle body and a spindle frame body connected to the columnar spindle body, and the first screen passes through a gap defined by the columnar spindle body and the columnar spindle body. Here, when the second screen constitutes a projection surface, the spindle section is in a state where the columnar spindle body is upright, and the first screen is in a state where the columnar spindle body is folded back. If the columnar spindle body is cylindrical, movement of the spindle body and passage of the screen become simple.

Springy support sections capable of being wound for independently supporting the first screen and the second screen are also provided. That is, a springy support section for supporting the screen surface is divided in two by the boundary between the first screen and the second screen, and the screen is capable of bending at the position of this divide. At this time, an end bearing section is provided at a tip end section of the first screen, and the structure of the end bearing section is such that it imparts tension to the first screen in a state where the first screen constitutes a projection surface, and is fixed to the storage tube in a state where the second screen constitutes a projection surface.

With each of the above-described structures, it is possible to use a directional light diffusion surface on the screen surface. With this type of structure, in a state where illumination light for a meeting room or the like is switched on also, it becomes possible to observe a clear screen image, and it is possible to significantly improve the image projection environment. As a result, since it is even possible to obtain a bright image using a low intensity projector, it is possible to reduce the burden with respect to thermal design and light source design in the projector manufacture.

On the other hand, by using an isotropic light diffusion surface as the screen surface, it is possible to carry out good quality image-projection that is very realistic at high brightness and a high viewing angle even in a dark room.

According to an image projection system comprising any of the above described screens and an optical image projector for projecting an optical image to the screen, it is possible to perform optimal image projection in line with display applications.

Detailed embodiments of a projector screen of the present invention will be described in the following.

[Embodiment 1]

Figure 1B:
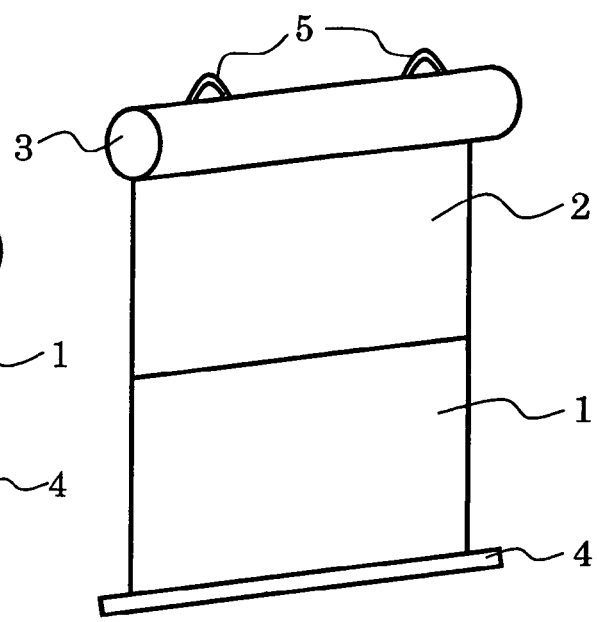

The structure of the screen of this embodiment is shown in FIG. 1. FIG. 1A shows a state where only a first screen having first optical characteristics is withdrawn or drawn out from a storage tube, and FIG. 1B shows a state where the first screen and a second screen having second characteristics are withdrawn or drawn out from the storage tube. As shown in FIG. 1B, the first screen 1 having first optical characteristics and the second screen having second optical characteristics have projection surfaces provided continuously facing in the same direction. An end bearing frame 4 is attached to a drawing out side end section (lower side) of the first screen 1, and the end bearing frame 4 functions as a spindle for successively pulling out drawn out sections of the first screen 1 and the second screen 2 in the direction of gravity. Since the turning force of the screen in the lateral direction is regulated by the end bearing frame 4, it is possible project an image keeping the screen surface flat and smooth. Further, when the first screen 1 and the second screen 2 are completely stored in the storage tube 3, the end bearing frame 4 also functions to prevent the end section (lower side) of the first screen 1 disappearing completely inside the storage tube 3. The first screen 1 and the second screen 2 can also be formed by laying out and joining screen sheets having different optical characteristics in a common support sheet shape, i.e., joining the upper side of the first screen 1 to the lower side of the second screen 2, and it is also possible to form the screens by joining together end sections of screen sheets having different optical characteristics.

On the other hand, it is possible for the first screen 1 and the second screen 2 to be stored wound up inside the storage tube 3. The storage tube 3 is a normal well known internal winding attachment structure. Specifically, a winding shaft 3a constituted of a core that is wound at the same time as fixing of one end of the second screen 2 is rotatably provided inside the storage tube 3. The winding shaft 3a always has a rotational force acting in a winding direction of the screen when the screen is drawn out by a spring having rotational force, such as a spiral spring, with one end fixed at an inner side of the storage tube 3, and the other end fixed to the winding shaft. Further, a stopper mechanism for fixing the screen against the winding force of the winding shaft 3a when the screen is pulled out, and a release mechanism for releasing the fixed screen, is provided. With the screen formed in this way, if the screen is pulled out from the storage tube 3, the stopper mechanism operates and fixes the screen at an arbitrary pull out position. Also, if the release mechanism is operated in a state where the screen is pulled out, the screen is automatically wound on the winding shaft by the winding force of the winding shaft. Also, a hanging structure 5 is formed on the storage tube 3, and this hanging structure 5 can be used to suspend the screen by hanging on hooks, etc.

As shown in FIG. 1A, if the stopper is operated in a state where the first screen 1 is pulled out, it is possible to use only the first screen 1. Also, as shown in FIG. 1B, if the stopper is operated in a state pulled out as far as the second screen 2, it is possible to use the second screen 2. Obviously, in this case the first screen 1 and the second screen 2 can also be used at the same time.

At that time, it is possible to realize screens having two types of projection characteristics in a single screen by using a screen having a directional light diffusion characteristic as the first screen 1, and using a screen that has a complete optical diffusion characteristic as the second screen. For example, a first screen having a directional optical diffusion characteristic is bright, but has a narrow viewing angle, which means that it is suitable for use in industry, such as in meetings. Also, since with the second screen having a complete optical diffusion characteristic, a gain at which it is possible to perform projection of an image that is a view of nature at a wide viewing angle is small, is suitable for use in appreciation of films etc. in a room in which comparatively wide illumination is restricted. As shown in FIG. 1(b), when working with this method of use, normally an image is only projected to one of either the first screen 1 or the second screen 2.

It is also possible to perform various types of image production by projecting different images to respective screens, using an arrangement where the first screen 1 and the second screen 2 have optical diffusion characteristics of differing gain, and using complete pulling out of the first screen 1 and the second screen 2 as shown in FIG. 1B.

[Embodiment 2]

Figure 2A:
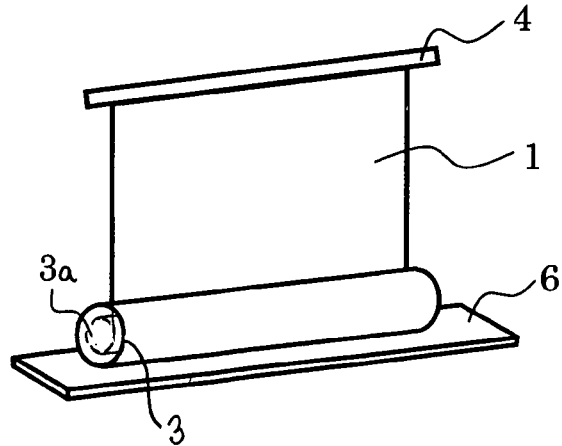
FIGS. 2A and 2B are perspective drawings showing a screen of the present invention.
Figure 2B:
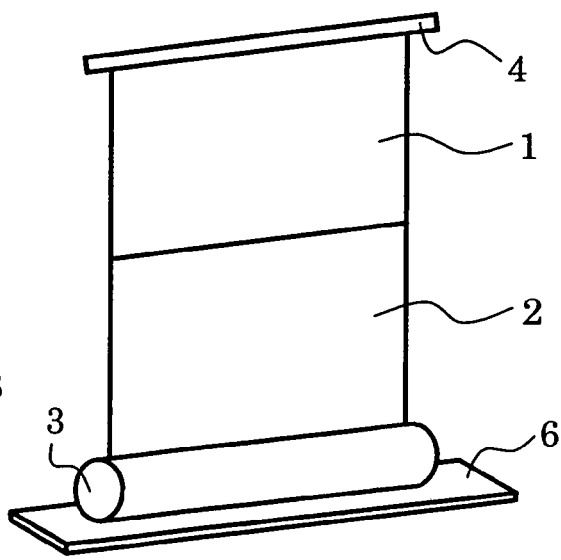

The structure of the screen of this embodiment is shown in FIG. 2. FIG. 2A shows a state where only a first screen 1 having first optical characteristics is drawn out from a storage tube, and FIG. 2B shows a state where the first screen and the second screen 2 having second characteristics are drawn out from the storage tube. The point of difference between this embodiment and the embodiment shown in FIG. 1 is that the storage tube 3 is arranged on the floor, and the screen surfaces are pulled up to an upper section. Elements that have the same operation as the first embodiment are assigned the same reference numerals, and description thereof is omitted. With this embodiment, since the storage tube 3 is floor mounted, a support base 6 for preventing falling is attached to the storage tube 3 so that the screen does not fall when the screen surface is pulled out. This support base 6 can also have any structure as long as it is a structure that prevents the screen falling, and can also take a support leg structure.

Figure 3:
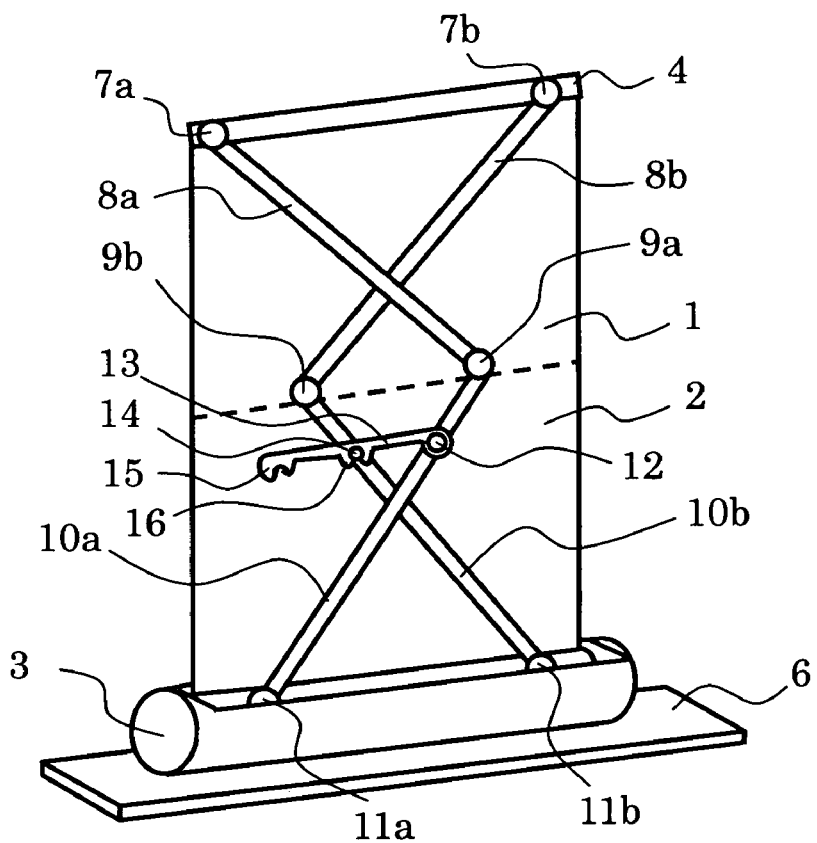
FIG. 3 is a perspective drawing showing a screen of the present invention.

One example of a screen surface lifting structure used with the screen shown in FIG. 2 is shown in FIG. 3. Fig. 3 is a schematic drawing showing the screen of FIG. 2 from a rear surface. Here, as well as being a structure for raising the screen surface, since the screen surface is a film shape with no mechanical rigidity, it is also necessary to have a structure for supporting the film surface when it is being pulled up. There is therefore an arm structure for supporting the film surface. This arm structure is comprised of a first upper arm 8a and a second upper arm 8b, and a first lower arm 10a and a second lower arm 10b, with the first upper arm 8a and the first lower arm 10a being rotatably joined by a first arm clamp 9a. Similarly, the second upper arm 8b and the second lower arm 10b are rotatably joined by a second arm clamp 9b.

On the other hand, another end of the first upper arm 8a is rotatably joined to the end bearing frame 4 with a first upper clamp 7a. Similarly, another end of the second upper arm 8b is rotatably joined to the end bearing frame 4 with a second upper clamp 7b. Further, the other end of the first lower arm 10a is rotatably joined to an inner surface of the storage tube 3 by a first lower clamp 11a. Also, the other end of the second lower arm 10b is rotatably joined to an inner surface of the storage tube 3 by a second lower clamp 11b.

A first pin 12 and a second pin 14 are respectively provided on the first lower arm 10a and the second lower arm 10b, and an arm fixing bar 13 is rotatably joined to the first pin 12 of the first lower arm 10a, so that the fixing bar dos not drop off. A first hook 15 and a second hook 16 are also formed on the arm fixing bar 13. The first hook 15 and second hook 16 are indented sections provided in the arm fixing bar 13, and engage with the second pin 14.

By providing this type of arm structure, when pulling the screen surface out of the storage tube 3 each upper arm maintains mechanical rigidity between the storage tube 3 and the end bearing frame 4, and it is possible to support the screen surface stably and smoothly. At this time, at a position where only the first screen 1 is pulled out completely, the first hook 15 provided on the arm fixing bar 13 is engaged with the second pin 14, making it possible to fix the arms and regulate force pushing the arms downwards in a gravity direction. Also, at a position where the second screen 2 is pulled out completely, the second hook 16 provided on the arm fixing bar 13 is engaged with the second pin 14, making it possible to fix the arms and regulate force pushing the arms downwards in a gravity direction.

Here, an example of a folding type arm structure has been described but it is also possible to support the screen surface with a well known telescopic arm structure that supports by joining between the storage tube 3 and the end bearing frame 4 with a straight telescopic arm.

Figure 4:
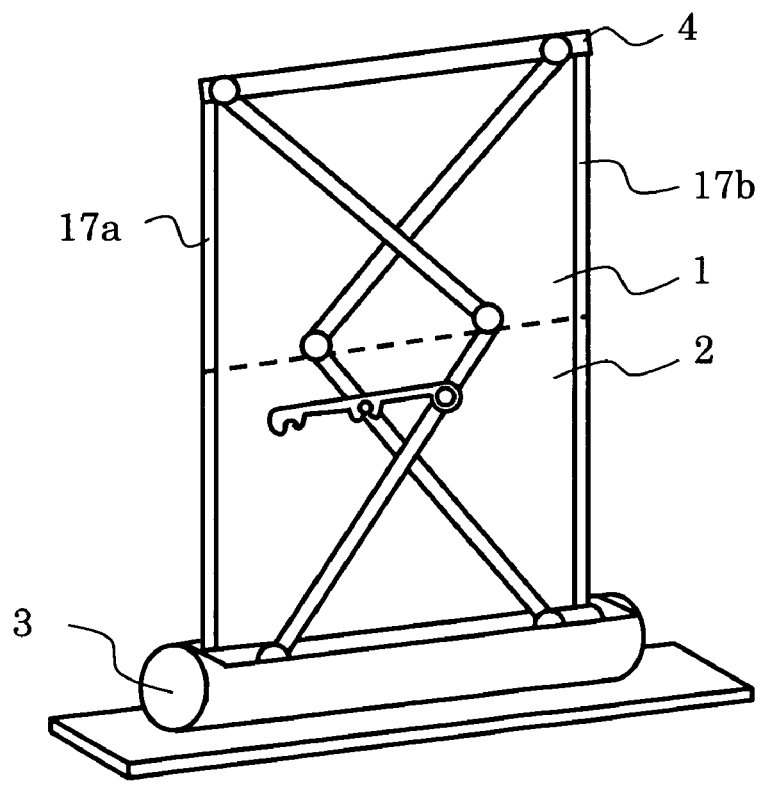
FIG. 4 is a perspective drawing showing a screen of the present invention.

Also, in the structure shown in FIG. 3, it is also possible to attach spring support bodies that can be wound to both side ends of the screen surface, parallel to the winding direction of the screen surface. This structure is shown schematically in FIG. 4. If both side ends of the screen surface are made long, it is difficult to keep the screen surface smooth with only the end bearing frame 4 and the winding shaft, and the two side ends of the screen surface curl inwards. The spring support bodies 17a and 17b are also provided, to avoid this type of curling of the two side ends or edges of the screen surface. It is possible to use, for example, spring stainless steel machined into a thin plate shape as the spring support bodies 17a, 17b. The optimum plate thickness of the stainless steel is dependent on the width of the spring support bodies 17a, 17b, but is preferably 0.1-0.6mm. The spring support body 17 formed in this way can be wound together with the screen surface when winding the screen surface inside the storage tube 3. On the other hand, when pulling the screen surface out from the storage tube 3, it may extend straight due to the inherent spring property, and so the spring support bodies 17a, 17b keep the screen surface smooth and flat in cooperation with the end bearing frame 4 and the above described winding shaft. Besides a metal material for a spring, such as spring stainless steel, it is also possible to use a high polymer material as the spring support frames 17a, 17b as long as it has sufficient springiness and winding characteristics. It is also possible to further retain smoothness of the screen surface by making the spring support bodies 17a, 17b have a curve in the width direction since force preserving the straightness at the time of extending the spring support bodies 17a, 17b becomes large.

[Embodiment 3]

A cross section of the screen of this embodiment is shown schematically in FIG. 5. With the structure shown in FIG. 1 and FIG. 2, when the second screen is used the height of the screen is twice that of a normal screen, and so there may be a disadvantage in use that the height of projection to the second screen is increased. With this embodiment, in order to avoid this drawback, in the case of using the second screen a structure is adopted where the first screen 1 is folded back to the rear surface of the second screen 2.

The screen of this embodiment has a columnar spindle body in the form of a cylindrical spindle 19 and a spindle frame 20 joined by a clamp frame 21. This spindle has a slit structure. That is, a screen surface passes through a slit shaped gap formed by the cylindrical spindle 19, the spindle frame 20 and the clamp frame 21. The cylindrical spindle 19 and the spindle frame 20 are formed from a fluorine series high polymer material such as Teflon (trademark of the du Pont company) or a material having good slip such as polyether ether ketone, and can be moved smoothly to sandwich the screen surface. Also, the cylindrical spindle 19 is capable of rotating freely, and at the same time as making movement smooth, whereby damage to the screen surface is prevented. With the example shown in Fig. 5, the spindle frame 20 is a rectangular solid, but by making the spindle frame 20 cylindrical, even smoother movement of the spindle becomes possible.

Figure 5A:
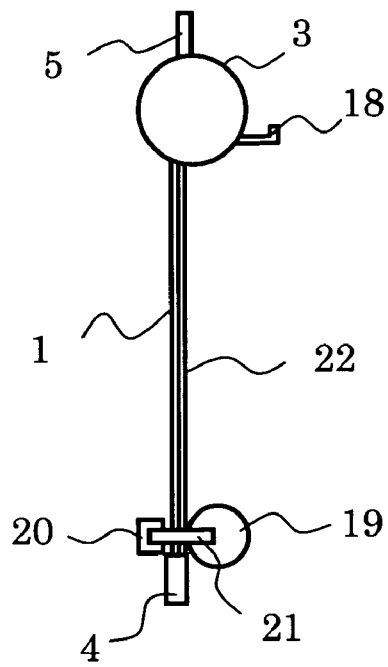
FIGS. 5A and 5B are a side view showing a screen of the present invention.
Figure 5B:
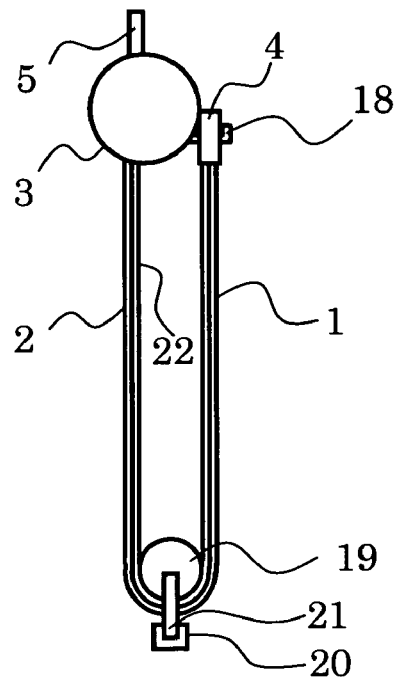

FIG. 5A shows a state where only the first screen 1 is pulled out from the storage tube 3. At this time, since there is the end bearing frame 4, the spindle does not fall out, and an operation to extend the screen surface to the lower side evenly is carried out. FIG. 5B shows a state-where the second screen 2 is pulled out from the storage tube 3, and the first screen 1 is folded back. A hole, not shown, is formed in the end bearing frame 4, and the first screen 1 is supported on a hanging pin 18 provided in the storage tube 3. At this time, the spindle moves to the vicinity of the boundary between the first screen 1 and the second screen 2, and operates to extend the first screen 1 and the second screen 2 in the gravitational direction and keep them level. Also, in this embodiment also, a spring support body 22 is connected to both ends of the screen surface, preventing the screen from curling.

[Embodiment 4]

A cross section of the screen of this embodiment is shown schematically in FIG. 6. In this embodiment, a spring support body 22a, 22b is connected to both side ends (edges) of the screen surface, but this spring support body is separated by the boundary 23 of the first screen 1 and the second screen 2. specifically, the first screen 1 has both side ends supported by the spring support body 22a, and the second screen 2 has both side ends supported by the spring support body 22b.

Figure 6A:
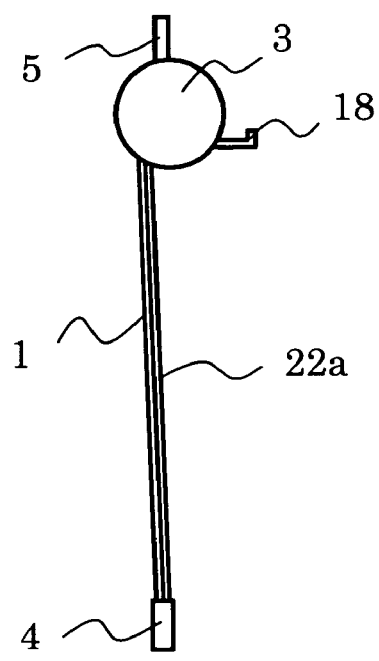
FIGS. 6A and 6B are a side view showing a screen of the present invention.
Figure 6B:
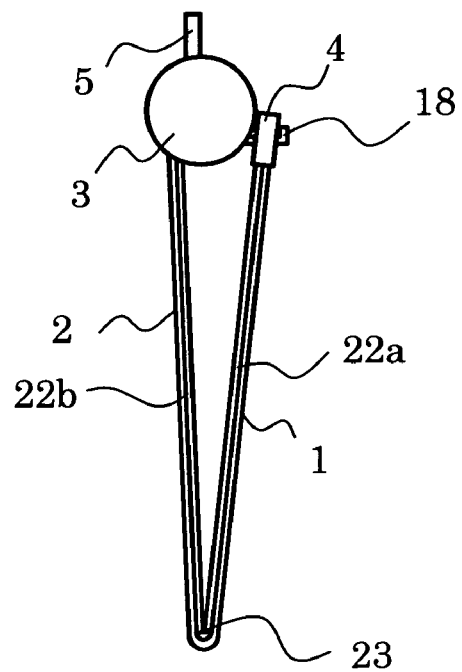

FIG. 6A shows a state where only the first screen 1 is pulled out from the storage tube 3. At this time, the screen surface is pulled by the end bearing section 4 and the spring support body 22a, and held level. FIG. 6B shows a state pulled out from the storage tube 3 as far as the second screen 2, folded back at a boundary 23 of the first screen 1 and the second screen 2, and hung from the hanging pin 18 by means of a hole, not shown, formed in the end bearing section 4. The spring support body is divided at the boundary 23, and the spring support bodies 22a and 22b respectively independently extend the first screen 1 and the second screen 2, making it possible to keep both screens level even in a folded back state.

As described above, according to the present invention it becomes possible to store two screens having different characteristics is a single storage tube, and it is possible to make a storage space for the screen small. Since it is possible to provide a screen that is respectively suitable, for example, for bright high definition image projection having directivity, and image projection with a wide viewing angle giving a high realism, in a single unit, it is possible to use a single screen unit in a versatile manner.

What is claimed is:

1. A screen comprising: a first screen having first optical characteristics; a second screen having second optical characteristics that are different from the first optical characteristics; a storage tube for winding and storing the first screen and the second screen together, wherein projection surfaces of the first and second screens face in the same direction and on the same surface, and the first screen is kept to be pulled out from the storage tube in a state where the second screen is stored in the storage tube; and a first arm structure for supporting the first screen and a second arm structure for supporting the second screen both provided at a reverse side of the projection screen, wherein the first arm structure and the second arm structure are each comprised of a pair of arms defining an X-shape, and the pair of arms of the first arm structure and the pair of arms of the second arm structure are rotatably connected by an arm clamp.

2. The screen according to claim 1, further comprising a stopper mechanism for simultaneously maintaining a state where the first screen is pulled out, and a state where the second screen is wound in the storage tube.

3. The screen according to claim 1, wherein the pair of arms of the first arm structure have one end connected to the arm clamp, and the other ends connected to the drawn out side ends of the first screen.

4. The screen according to claim 1, further comprising a springy support body that is capable of being wound and that supports the first screen and the second screen, the springy support body being divided in the vicinity of a boundary between the first screen and the second screen, and the screen being capable of folding at the divided part of the support body.

5. A screen comprising: a first screen having first optical characteristics; a second screen having second optical characteristics that are different from the first optical characteristics; a storage tube for winding and storing the first screen and the second screen together, wherein projection surfaces of the first and second screens face in the same direction and on the same surface, and the first screen is kept to be pulled out from the storage tube in a state where the second screen is stored in the storage tube; a spindle section for applying tension to the surface of the first screen in a state where the first screen is pulled out; and an end bearing frame at a tip end of the first screen, the spindle section being formed to freely rotate without being fixed to the first screen, and the end bearing frame preventing the spindle section from dropping off.

6. The screen according to claim 5, wherein the spindle section is provided with a columnar spindle body and a spindle frame connected to the columnar spindle body, and the screen passes through a gap formed by the columnar spindle body and the spindle frame.

7. The screen according to claim 6, wherein the spindle section is movable to a state where the columnar spindle body is upright, and the first screen is in a state folded back at the columnar spindle body, when the second screen constitutes a projection surface.

8. The screen according to claim 7, wherein the columnar spindle body is cylindrical.

9. The screen according to claim 5, further comprising an end bearing section provided at a tip end section of the first screen, wherein the end bearing section imparts tension to the first screen in a state where the first screen constitutes a projection surface, and the end bearing section is fixed to the storage tube in a state where the second screen constitutes a projection surface.

10. An image projection system having an optical image projector for projecting an optical image; and a screen according to claim 1 on which the optical image is projected.

11. A projection screen comprising: a first screen that has opposed upper and lower sides and a projection surface that has first optical characteristics; a second screen that has opposed upper and lower sides and a projection surface that has second optical characteristics different from the first optical characteristics, the lower side of the second screen being joined to the upper side of the first screen with the projection surfaces of both screens facing in the same direction; and a storage tube having therein only one winding shaft, the winding shaft being connected to the upper side of the second screen, and the winding shaft being rotatable in one direction to successively wind the second and then the first screens therearound for storage in the storage tube and rotatable in the other direction in response to a pulling force exerted on the first screen to successively unwind the first and then the second screens therefrom for withdrawal from the storage tube.

12. A projection screen according to claim 11; further including an end frame attached to the lower side of the first screen for use in pulling the first screen out of the storage tube for unwinding the first and second screens from the winding shaft.

13. A projection screen according to claim 12; further including a spindle section that is freely rotatable relative to the first screen and that exerts downward tension to the first screen in a state where the first screen is pulled out of the storage tube, the spindle section being engageable with the end frame to prevent the spindle section from dropping off.

14. A projection screen according to claim 12; further including spring support bodies connected to the first and second screens and extending along opposed side edges thereof for supporting the first and second screens in a state where the first and second screens are withdrawn from the storage tube.

15. A projection screen according to claim 14; wherein the first screen and the spring support bodies connected thereto are foldable along a boundary that separates the first and second screens to a position behind the second screen.

16. A projection screen according to claim 15; further including means for releasably attaching the end frame to the storage tube when the first screen is folded behind the second screen.

17. A projection screen according to claim 12; further including a first arm structure that supports the first screen in a state where the first screen is withdrawn from the storage tube, and a second arm structure that supports the second screen in a state where the second screen is withdrawn from the storage tube.

18. A projection screen according to claim 17; further including spring support bodies connected to the first and second screens and extending along opposed side edges thereof for supporting the first and second screens in a state where the first and second screens are withdrawn from the storage tube.

* * * * *